Patented July 3, 1945

2,379,507

UNITED STATES PATENT OFFICE 2,379,507

VEHICLES FOR APPLICATION OF CERAMIC COLORS

Alden J. Deyrup, Elizabeth, N. J., assignor to E. I. du Pont de Nemours & Company, Wilmington, Del., a corporation of Delaware No Drawing. Application May 1, 1940, Serial No. 332,731

15 Claims. (Cl. 260—16)

This invention relates to vehicles for the application of ceramic colors, such as glass enamels, to ceramic ware and other ware to be decorated. More particularly, the invention relates to improved media for suspending a ceramic color for use in applying that color to ceramic ware or glassware which is to be decorated by means of the squeegee process.

Ceramic colors, usually low melting enamel glazes, are applied commercially to glass and ceramic ware to be decorated by various methods including spraying, brushing, and by means of the squeegee method. This invention relates to vehicles for suspending enamel glazes to form a resulting paint which is of particular utility in the squeegee method of decorating, although my improved media may be used to suspend ceramic color compositions intended for application to ceramic ware to be decorated by other methods.

In the squeegee method of decorating ceramic ware, which method is widely used in the glass decorating industry, a finely-powdered vitrifiable ceramic glaze composition is dispersed in an oily medium in order to form a thick paint. This paint is placed upon a stencil which is ordinarily mounted on a silk or metal screen. A flat strip of rubber (squeegee) is drawn across the stencil and the paint containing the dispersed vitrifiable ceramic color is forced through the mesh onto the surface of the glass or ceramic article to be decorated where the mesh of the stencil is not masked. In this way it is possible to produce any ceramic design by masking suitable portions of the stencil, the vitrifiable color forced through the stencil taking the form of the design.

After the decoration is applied to the glass or other ceramic article to be decorated, the article is placed in a decorating lehr. In the lehr, the constituents of the vehicle are volatilized or burned off during the period wherein the decorated glass or ceramic ware in its course through the lehr approaches the maximum temperature zone on the lehr belt. When the article arrives at the zone of maximum temperature the glass enamels on the article soften and fuse to a glossy decoration. The vehicle must be of such character that all its constituents volatilize or burn off completely before the enamel begins to mature, as any organic material remaining unvolatilized or unburned in the vehicle would interfere with the resulting decoration, either by discoloring that decoration as the result of the presence of unburned carbon, or by causing blistering of the design by escaping organic gases or oxides of carbon during that period when the glass enamel softens and matures to the desired glossy decoration. As a practical matter, it is not possible to burn out more than very small traces of carbon which may be formed by the pyrolytic decomposition of organic compounds present in the vehicle, because the majority of glass enamels begin to soften and fuse in the temperature range 400–500° C., which range is below the temperature at which the combustion of carbon begins to proceed at any appreciable rate. It is, therefore, necessary that any constituents remaining in the vehicle after evaporation of solvents therefrom, e. g. the bonding agents, resins, etc., be practically completely volatile so that they may escape from the vehicle prior to that phase of the process wherein the glass enamel is fused, without leaving more than very small traces of unburned carbon.

The properties required in a vehicle or medium suitable for suspending a ceramic color for the squeegee decoration of ceramic ware are distinct, and differ materially from the properties necessary for the usual vehicle for paints, lacquers, varnishes, and baked enamels. As contrasted with the usual vehicles for coating compositions of the types enumerated, vehicles for suspending vitrifiable ceramic flux compositions for use in the decoration of glassware and ceramic articles by the squeegee process need not possess the property of retaining a glossy surface after drying. Moreover, vehicles for suspending vitrifiable ceramic colors must have the property of bonding to the ware only to the relatively small extent necessary to resist deterioration during handling and during the rubbing involved in the superimposition on the decorated ware of a second coating of paint comprising a suspended vitrifiable composition. As distinguished from the usual color vehicles, they must possess the property of volatilizing when heated leaving behind little or no carbonaceous residue. They must be more viscous than the usual paint vehicle, and must have greater dispersive properties in order that they may retain in suspension glaze enamels which are much coarser than any of the pigments used in paints, varnishes, or lacquers.

The properties essential in an ideal vehicle for suspending ceramic vitrifiable color compositions for use in the process of decorating ware by the squeegee process may be summarized as follows. On heating the vehicle and suspended color, there must be little or no residue, and the solvents and other ingredients comprising the vehicle must volatilize or burn off without appreciable residue at a temperature below that at which the vitrifiable composition softens and matures to desired glossy decorative surface coat. The drying rate of the squeegee media should be slow enough to prevent plugging of the screen by drying thereon during the process of decoration, but it should be fast enough to permit handling of the decorated article and the rubbing incident to the application of a second decorative coating within a short time after the first application. The degree of bonding of the vehicle to the ware to be decorated should be sufficient to prevent injury of the design before firing during handling, or during the application of a second design by the use of the squeegee method.

The viscosity of the ideal media should be high enough to assist in the dispersion of the vitrifiable color composition in grinding the paint using for grinding a mill of the Buhr, roller or colloid mill types. The vehicles should be sufficiently viscous to hinder settling out of the solid particles of the vitrifiable color composition. As the capacity of the vehicle to carry a ceramic color decreases with increase in viscosity, the viscosity of the ideal medium should not be too great to interfere with satisfactory color-carrying capacity.

The squeegee medium should have dispersion characteristics sufficiently high to cause satisfactory leveling of irregularities or screen marks on the decoration. As highly dispersed paints have a definite tendency to run and sag on the vertical surfaces of ware, it is evident that the dispersion characteristics of the medium should be such as not to result in running or sagging to a deleterious extent. Finally, the vehicle must have sufficient stability to prevent "livering" or thickening of the paint on aging after preparation.

Accordingly, it is the principal object of this invention to prepare vehicles suitable for suspending vitrifiable color compositions for use in the squeegee decorating process, which vehicles will meet the requirements above enumerated to as satisfactory a degree as possible. Another object of this invention is the production of improved vehicles for suspending vitrifiable, ceramic, decorative color compositions, which vehicles contain ethyl cellulose for imparting the desired viscosity to the resulting paint, these vehicles also containing hydrogenated rosin which serves as an effective bonding agent and possesses, to a very high degree, the important property of leaving little or no carbonaceous residue on the ware during firing.

A further object of this invention is the production of improved squeegee media meeting the requirements enumerated above by the careful adjustment and proportioning of the ingredients present in my improved vehicles, so that the resulting media and paints containing the suspended vitrifiable color composition may approach more nearly to the ideal than ever before attainable with compositions of this type for the decoration of glass and ceramic ware. These and still further objects of my invention will be apparent from the ensuing disclosure of certain improved embodiments thereof.

Squeegee vehicles for suspending ceramic colors as now known in the art are generally prepared by the admixture of various solvents, natural gums, and resins. In the past, no great difficulty has been encountered in securing completely volatile solvents of satisfactory drying rate, and the art has considered pine oil and the higher boiling fractions of pine oil suitable for use as the solvents. However, very few gums or resins have been available to the art which meet the requirement of leaving behind even moderately little residue on heating. Of the gums and resins now used in the preparation of such vehicles, only two, balsam of copaiba and gum damar, have been satisfactory for imparting to the vehicle sufficient viscosity to secure a paint having satisfactory working properties. These gums have been used, in the past, to impart viscosity, bonding strength, and dispersion properties to the vehicle simultaneously, with the result that previously known media represent a compromise between the various qualities desired. This has required great care in application of the ceramic paint, and it was essential that the decorated product be fired at a slow rate in order to produce commercially acceptable results.

By the use of my improved vehicles it is possible to adjust the individual requirements of squeegee media almost completely independent of one another as desired, and, because of this independent regulation of the essential properties, it is possible to secure vehicles in which the controlling characteristics are adjusted so that they approach much more closely those of the ideal medium than previously hitherto possible.

The improved properties of my squeegee media are largely the result of the presence of ethyl cellulose therein. I have discovered that ethyl cellulose may be dissolved in terpene solvents such as pine oil and alpha terpineol to yield a solution having any desired viscosity within the range of viscosities suitable for squeegee vehicles. Any four of the grades of ethyl cellulose commercially offered may be used, either ethyl cellulose of low viscosity, ethyl cellulose of medium viscosity, or the high or extra high viscosity grades. Surprisingly enough, but very small amounts of ethyl cellulose are sufficient to insure the resulting vehicle having the desired viscosity properties. In view of the complex chemical nature of ethyl cellulose, it was not to be expected that a product of this type could be volatilized or decomposed by heat without leaving behind apreciable amounts of carbonaceous residue. Remarkably enough, ethyl cellulose leaves behind, when volatilized or decomposed by the action of heat, a substantially less amount of carbonaceous residue than any of the known substances which have, in the past, been added to squeegee vehicles for the purpose of imparting desirable viscosity characteristics thereto.

In order to secure satisfactory bonding properties for the squeegee vehicle, and for the paint resulting when a ceramic vitrifiable color composition is suspended therein, I prefer to employ hydrogenated rosin. The product sold commercially under the trade-mark name "Staybelite A-1" is the commercially available hydrogenated rosin that is preferred, as this product is of uniform quality and is available in large amounts.

However, other hydrogenated rosins may of course be used. When present in squeegee vehicles of the type with which this invention is concerned, hydrogenated rosin has been found to possess the very important property of leaving behind little or no carbonaceous residue when heated. Moreover, it imparts the desired bonding characteristics to the paint composition, and permits the separate and independent adjustment of the bonding characteristics so that they may fall within any desired range. That practically no carbonaceous residue is left behind when hydrogenated rosin is heated is somewhat astonishing, in view of the fact that even the best grades of commercial rosin when present in squeegee vehicles are very detrimental to glass enamels and cannot be employed satisfactorily in commercial vehicles because they leave behind large amounts of carbonaceous residue.

In order to secure the desired dispersion properties, i. e. to secure proper dispersion of the glass enamel in the terpene solvent system, I prefer to include lecithin in my improved squeegee media. Various modified alkyd resins may also be incorporated for adjustment of the dispersion properties of the resulting composition. The alkyd resins are condensation products of glycerine, phthalic anhydride, and natural oils and fats such as castor oil, linseed oil, etc. While lecithin and alkyd resins have previously been employed as dispersion agents for pigments in certain paints and varnishes, they have never been previously considered satisfactory for suspending coarse pigmentary material such as the relatively coarse ceramic enamels. In the past they have been used for dispersing only very fine colors of the type present in commercial paints and varnishes. By separately adjusting the amounts of lecithin and alkyd resins present in my improved vehicles for squeegee use, it is possible to secure practically any desired dispersion characteristics within a very wide range of suitable values. In order to prevent gelling or thickening of the glass enamel paints on standing, it is preferred to include very small amounts of pyrogallic acid in the vehicle composition. While not absolutely essential, small amounts of pyrogallic acid serve to prevent undesired thickening of the vehicle or paint on standing and are very effective for this purpose.

In preparing improved vehicles for suspending ceramic colors, suitable for use in squeegee processes, I may first prepare a mixture of solvents having a composition such as to secure any desired drying rate. The bonding agents, viscosifier, and dispersion and stabilizing agents, in the proportions necessary to obtain all the properties required for the resulting paint, may then be added. These properties may vary to some extent according to the particular conditions under which the vehicle and resulting paint are to be used, and it is possible to regulate these properties almost independently of each other by incorporating suitable amounts of the essential constituents.

As the solvent, it is preferred to employ terpene solvents such as terpineol, pine oil, turpentine, and "Terposol #8." "Terposol #8" is a terpene solvent of the type described and claimed in U. S. Patent 2,136,011, prepared by adding a polyhydric alcohol to a double bond of an unsaturated terpenic group contained in the terpene. In some cases part of the solvent may be a volatile petroleum solvent such as "Varsol" (a special fraction of kerosene of certain specified boiling point range, flash point 40° F., and specific gravity 0.782, offered commercially under this trademark name).

In some cases where the properties required of the vehicle permit or demand of such omission, it may be desirable to omit some of the ingredients which have been previously specified as constituents capable of incorporation in my improved vehicles. Pyrogallic acid may frequently be omitted under circumstances where it is not required that the ceramic paint be stable on standing for prolonger periods of time. In some cases, special plasticizers may be added, such as methyl abietate which serves to modify the bonding characteristics of the hydrogenated rosin. In some cases, hydrogenated rosin, lecithin, and alkyd resins may be replaced by gum damar which acts as a bonding agent and, to some extent, as a dispersion agent. While gum damar and pine oil have previously been employed in ceramic vehicles, they have never been employed in compositions also containing ethyl cellulose. The presence of gum damar and pine oil in my improved vehicle compositions containing ethyl cellulose permits the simultaneous securement of desirable viscosity and high stability characteristics with freedom from large amounts of carbonaceous residues on heating or burning.

My preferred vehicles are those which have the following ingredients present in the specified percentages by weight used on the total weight of the vehicle.

| | Per cent |
|---|---|
| Terpene solvents (pine oil and pine oil fractions such as terpineol) | 55–85 |
| Ethyl cellulose | 0.25–3.0 |
| Hydrogenated rosin | 10–30 |

The product may also contain soya lecithin in amounts ranging from 0.1 to 1.5%, or alkyd resin in amounts ranging up to 4%, or both ingredients in amounts up to the specified maximum percentages. Pyrogallic acid in amounts ranging from 0.2 to 0.7% may also be present.

As examples of preferred compositions suitable for suspending ceramic colors in the decoration of ceramic ware by the squeegee process, and for other purposes, the following may be given. In all cases, these media were prepared by mixing the ingredients, stirring, and warming the mixture preferably at a temperature not in excess of 35° C., until homogeneous solution occurred.

Example I

A vehicle was prepared containing the following ingredients in the specified proportions. All parts are by weight based on the total weight of the vehicle composition.

| | Per cent |
|---|---|
| Alpha terpineol | 46.7 |
| Terposol #8 | 6.7 |
| "Staybelite No. A–1" | 13.4 |
| Methyl abietate | 6.7 |
| Pine oil | 13.4 |
| Ethyl cellulose (medium viscosity grade) | 1.3 |
| Glyptal resin "RA–189" | 2.2 |
| Soya lecithin | 0.7 |
| "Varsol" | 8.9 |

Glyptal resin "RA–189" is a product sold commercially comprising a 70% solution in toluene of a condensation product of 5.9 parts glycerine, 39.3 parts phthalic anhydride, 21.3 parts diethylene glycol, and 33.5 parts of coconut oil, reacted together.

When a vitrifiable ceramic composition suspended in this medium and the product used for decorating ceramic ware by the squeegee method, the resulting product, when fired, was entirely satisfactory from every commercial requirement.

Example II

A squeegee medium was prepared by mixing the following ingredients and stirring until homogeneous solution resulted:

| | Per cent |
|---|---|
| Alpha terpineol | 45.8 |
| Terposol #8 | 2.2 |
| "Staybelite No. A-1" | 26.1 |
| Pine oil | 13.1 |
| Ethyl cellulose (medium viscosity grade) | 1.0 |
| Glyptal resin "RA-189" | 2.2 |
| Soya lecithin | 0.6 |
| "Varsol" | 8.7 |
| Pyrogallic acid | 0.3 |

Example III

A medium for suspending vitrifiable ceramic color compositions was prepared by admixing the following:

| | Per cent |
|---|---|
| Pine oil | 60.2 |
| Ethyl cellulose (medium viscosity grade) | 2.0 |
| Pyrogallic acid | 0.4 |
| Gum damar | 20.6 |
| Turpentine | 16.8 |

The resulting medium when utilized for suspending vitrifiable ceramic colors which were applied to glassware by the squeegee method gave excellent results.

Example IV

A medium for suspending vitrifiable ceramic color compositions was prepared by admixing the following ingredients:

| | Per cent |
|---|---|
| Alpha terpineol | 79.0 |
| "Staybelite No. A-1" | 20.0 |
| Ethyl cellulose (medium viscosity grade) | 1.0 |

Although increased color dispersion characteristics would be more desirable, the vehicle was utilized for suspending a ceramic glaze composition and applying the glaze by the squeegee method to ceramic ware to be decorated.

My improved squeegee vehicles yield ceramic paints of superior working properties from which better fired decorations with lessened objectionable screen marking can be produced with a lower proportion of rejects because of blemishes such as darkening or blistering when employed commercially for the manufacture of articles decorated with colored glass enamels. By the use of my improved vehicles, the time required for firing may also be somewhat reduced with resulting reduction in firing expense. Moreover, the improved media permit the utilization of chemically resistant enamels which, because of their specific composition and constituents are very difficult to fire satisfactorily when suspended in the squeegee vehicles previously available to the industry.

To those skilled in the art many modifications and widely different embodiments of my invention will be readily suggested. It is not intended that the invention should be restricted to compositions, proportions, procedures, and details given herein as merely illustrative, as its scope is to be construed in accordance with the prior art and suspended claims.

I claim:

1. A vehicle for suspending vitrifiable ceramic colors which comprises ethyl cellulose, a terpene solvent, and hydrogenated rosin.

2. A vehicle for suspending vitrifiable ceramic colors which comprises ethyl cellulose, pine oil, and hydrogenated rosin.

3. A vehicle for suspending vitrifiable ceramic colors which comprises a terpene solvent, ethyl cellulose, hydrogenated rosin, and pyrogallic acid.

4. A vehicle for suspending vitrifiable ceramic colors which comprises ethyl cellulose, pine oil, hydrogenated rosin, and pyrogallic acid.

5. A vehicle for suspending vitrifiable ceramic color compositions which comprises ethyl cellulose; a terpene solvent; hydrogenated rosin; alkyd resin; soya lecithin; and a kerosene solvent.

6. A vehicle for suspending vitrifiable ceramic colors which comprises ethyl cellulose present in amounts ranging from 0.25% to 3.0%, hydrogenated rosin present in amounts ranging from 10% to 30%, and a terpene solvent present in amounts ranging from 55% to 85%, all parts being by weight based on the total weight of the composition.

7. A vehicle for suspending vitrifiable ceramic colors which comprises ethyl cellulose present in amounts ranging from 0.25% to 3.0%, hydrogenated rosin present in amounts ranging from 10% to 30%, a terpene solvent present in amounts ranging from 55% to 85%, and pyrogallic acid present in amounts ranging from 0.2% to 0.7%, all parts being by weight based on the total weight of the composition.

8. A vehicle for suspending vitrifiable ceramic colors which comprises ethyl cellulose present in amounts ranging from 0.25% to 3.0%, hydrogenated rosin present in amounts ranging from 10% to 30%, a terpene solvent present in amounts ranging from 55% to 85%, soya lecithin present in amounts ranging from 0.1% to 1.5%, and pyrogallic acid present in amounts ranging from 0.2% to 0.7%, all percentages being by weight based on the total weight of said vehicle.

9. A vehicle for suspending vitrifiable ceramic colors which comprises ethyl cellulose present in amounts ranging from 0.25% to 3.0%, hydrogenated rosin present in amounts ranging from 10% to 30%, a terpene solvent present in amounts ranging from 55% to 85%, soya lecithin present in amounts ranging from 0.1 to 1.5%, and alkyd resin present in amounts up to 4%, all percentages being by weight based on the total weight of said vehicle.

10. A vehicle for suspending vitrifiable ceramic colors which comprises ethyl cellulose present in amounts ranging from 0.25% to 3.0%, hydrogenated rosin present in amounts ranging from 10% to 30%, a terpene solvent present in amounts ranging from 55% to 85%, soya lecithin present in amounts ranging from 0.1% to 1.5%, alkyd resin in amounts ranging up to 4%, and pyrogallic acid present in amounts ranging from 0.2% to 0.7%, all percentages being by weight based on the total weight of said vehicle.

11. A vehicle for suspending vitrifiable ceramic colors which has the following composition: alpha terpineol 45.8%; a terpene solvent prepared by adding a polyhydric alcohol to a double bond of an unsaturated terpenic group of a terpene 2.2%; hydrogenated rosin 26.1%; pine oil 13.1%; ethyl cellulose 1.0%; alkyd resin 2.2%; soya lecithin 0.6%; petroleum solvent 8.7%; and pyrogallic acid 0.3%; all percentages being by weight based on the total weight of said vehicle.

12. A ceramic composition comprising a vitrifiable glaze suspended in a medium comprising ethyl cellulose and a terpene solvent.

13. A ceramic composition comprising a vitrifiable glaze suspended in a medium comprising ethyl cellulose and pine oil.

14. A ceramic composition comprising a vitrifiable glaze suspended in a medium comprising ethyl cellulose, hydrogenated rosin and a terpene solvent.

15. A ceramic composition comprising a vitrifiable glaze suspended in a medium comprising ethyl cellulose, gum damar and a terpent solvent.

ALDEN J. DEYRUP.

CERTIFICATE OF CORRECTION.

Patent No. 2,379,507. July 3, 1945.

ALDEN J. DEYRUP.

It is hereby certified that error appears in the printed specification of the above numbered patent requiring correction as follows: Page 3, second column, line 12, for "prolonger" read --prolonged--; page 4, second column, line 60, claim 10, after "resin" insert --present--; page 5, second column, line 5, claim 15, for "terpent" read --terpene--; and that the said Letters Patent should be read with this correction therein that the same may conform to the record of the case in the Patent Office.

Signed and sealed this 9th day of October, A. D. 1945.

Leslie Frazer (Seal)

First Assistant Commissioner of Patents.

fiable glaze suspended in a medium comprising ethyl cellulose and a terpene solvent.

13. A ceramic composition comprising a vitrifiable glaze suspended in a medium comprising ethyl cellulose and pine oil.

14. A ceramic composition comprising a vitrifiable glaze suspended in a medium comprising ethyl cellulose, hydrogenated rosin and a terpene solvent.

15. A ceramic composition comprising a vitrifiable glaze suspended in a medium comprising ethyl cellulose, gum damar and a terpent solvent.

ALDEN J. DEYRUP.

CERTIFICATE OF CORRECTION.

Patent No. 2,379,507.   July 3, 1945.

ALDEN J. DEYRUP.

It is hereby certified that error appears in the printed specification of the above numbered patent requiring correction as follows: Page 3, second column, line 12, for "prolonger" read --prolonged--; page 4, second column, line 60, claim 10, after "resin" insert --present--; page 5, second column, line 5, claim 15, for "terpent" read --terpene--; and that the said Letters Patent should be read with this correction therein that the same may conform to the record of the case in the Patent Office.

Signed and sealed this 9th day of October, A. D. 1945.

Leslie Frazer (Seal)

First Assistant Commissioner of Patents.